Sept. 19, 1950  A. J. RICHERT ET AL  2,523,059
OVERLOAD SUPPORTING CAP FOR ELECTRIC MACHINES
Filed April 22, 1949
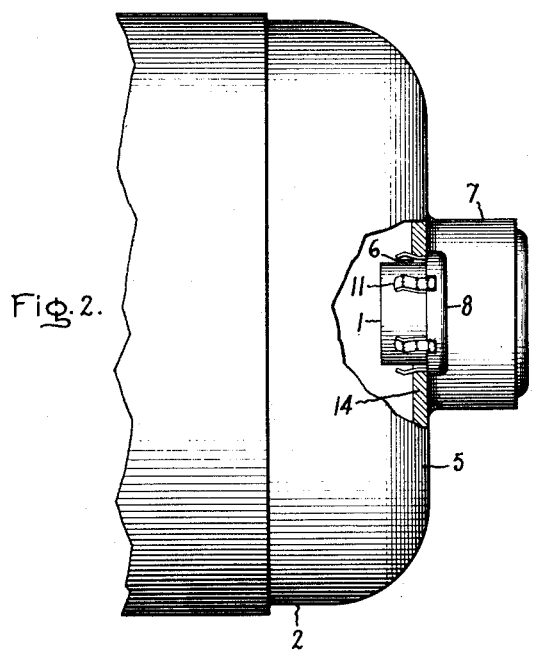
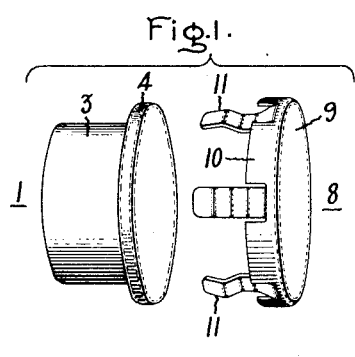
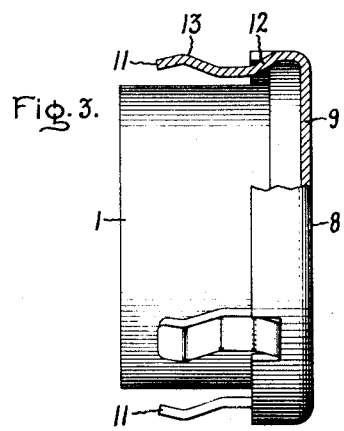
Inventors:
Abraham J. Richert,
Richard Steele,
by Rarcee S. Mack
Their Attorney.

Patented Sept. 19, 1950

2,523,059

UNITED STATES PATENT OFFICE 2,523,059

OVERLOAD SUPPORTING CAP FOR ELECTRIC MACHINES

Abraham J. Richert, Fort Wayne, and Richard Steele, Decatur, Ind., assignors to General Electric Company, a corporation of New York Application April 22, 1949, Serial No. 89,034

2 Claims. (Cl. 171—252)

This invention relates to an improvement in a device for mechanically supporting overload devices on dynamoelectric machines and more particularly for positioning such an overload device in a motor end shield.

An object of this invention is to provide a simplified installation for an overload device wherein the overload is resiliently held in a novel mounting device which in turn is resiliently secured in an opening in a motor end shield.

A further object is to provide a construction wherein the overload is readily accessible and removable from the supporting member without the use of tools.

Other objects and uses will be apparent from an inspection of the drawings and specification hereinafter set forth.

Fig. 1 is an elevation of the overload and supporting cap before assembly.

Fig. 2 is a cutaway elevation showing the overload secured within the supporting cap which in turn is held by the motor end shield.

Fig. 3 is an elevation of an assembled overload and supporting cap.

Basically, a means is required for mechanically supporting an overload device 1 on a dynamoelectric machine, generally identified as 2. The physical structure of the overload 1 comprises a cylindrical portion 3 having an annular end piece or rim 4 of slightly larger diameter than the cylinder. The dynamoelectric machine has an end shield 5 in which there is an opening 6 of slightly larger diameter than the overload fuse and which is conveniently displaced from the axis or bearing cap 7.

Until the present invention, a supporting cap was used which comprised a drawn shell with a bottom in the drawn section large enough to accommodate the rim of the overload plug. A snap ring with an outer diameter smaller than the drawn section but larger than the opening in the end shield was slipped over the overload and the assembly was then inserted in the opening in the end shield and held there by two self-tapping screws. This type installation requires a certain amount of mechanical skill for the inserting of the snap ring and the locating of the two self-tapping screws.

The subject invention which will be hereinafter described is a distinct improvement over the former method of securing the overload, since with the new device mechanical skill is no longer necessary for the installation and, in addition, much time is saved with each installation.

The new supporting cap 8 comprises a circular end portion 9 having an annular flange portion 10 extending from the periphery thereof so as to form a somewhat open-ended cylinder, and a plurality of resilient legs 11 axially extending from the flange portion 10. Each of the legs 11 has an inwardly-directed bend 12 so shaped as to form a socket for the rim 4 of the overload fuse 1. In addition, each leg has an outwardly-directed bend 13 so positioned as to engage the inner peripheral wall 14 of the opening 6 in the motor end shield 5.

With this improved supporting cap the method of mechanically securing the overload 1 in the electrical circuit of the dynamoelectric machine 2 is as follows. The overload is axially pressed into engagement with the supporting cap 8. The legs 11 resiliently spread so as to permit the shoulder 4 to come in contact with the inner face of the end piece 9 whereupon the legs return to their normal position and the inwardly-directed bend 12 of the legs 11 engages the shoulder 4 of the overload 1. This assembly is then axially pressed into the opening 6 in the motor end shield 5. The legs 11 are forced toward the axis of the supporting cap 8 until the outwardly-directed bend 13 of the legs 11 passes completely through the opening 6 in the end shield 5 whereupon the legs are resiliently restored to their normal position with the outwardly-extending bend 13 engaging the inner peripheral wall 14 of the opening 6 in the end shield 5. The extent of the insertion of the supporting cap into the opening 6 is controlled by the sides 10 which are on a diameter larger than that of the opening, and hence prevent the legs 11 from entering beyond the position that will resiliently lock the support in place as above described.

Modifications of this invention will occur to those skilled in the art and it is desired to be understood, therefore, that this invention is not to be limited to the particular arrangement disclosed, but that the appended claims are meant to cover all modifications which do not depart from the spirit and scope of this invention.

What we claim as new and desire to secure by Letters Patent of the United States is:

1. In a dynamoelectric machine, the combination of an end shield having an opening therein, a supporting cap comprising a circular end disk having a flange extending axially therefrom, a plurality of resilient legs extending axially from the said flange, each of said legs having an inwardly directed portion adjacent its point of connection to said supporting cap, an overload device supported by said cap and having a shoulder adapted to be engaged by said leg portion, each of said legs including an outwardly directed portion adapted to engage the periphery of the said opening in the end shield of the dynamoelectric machine to position said supporting cap and overload device.

2. In an end shield of a dynamoelectric machine having an opening therein, the combination of a circular supporting cap having a plurality of resilient legs extending axially from the periphery thereof, each of said legs having an inwardly-directed portion adjacent its point of connection to said supporting cap, an overload device supported by said cap and having a shoulder adapted to be engaged by said leg portion, each of said legs including an outwardly-directed portion adapted to engage the periphery of the said opening in the end shield of the dynamoelectric machine to position the said supporting cap and overload device.

ABRAHAM J. RICHERT.
RICHARD STEELE.

REFERENCES CITED

The following references are of record in the file of this patent:

UNITED STATES PATENTS

| Number | Name | Date |
| --- | --- | --- |
| 1,800,173 | Anderson | Apr. 7, 1931 |
| 2,006,747 | Woller | July 2, 1935 |
| 2,446,141 | Parsons | July 27, 1948 |